July 11, 1950 — R. R. ROOT — 2,514,516
DUSTER
Filed March 26, 1946
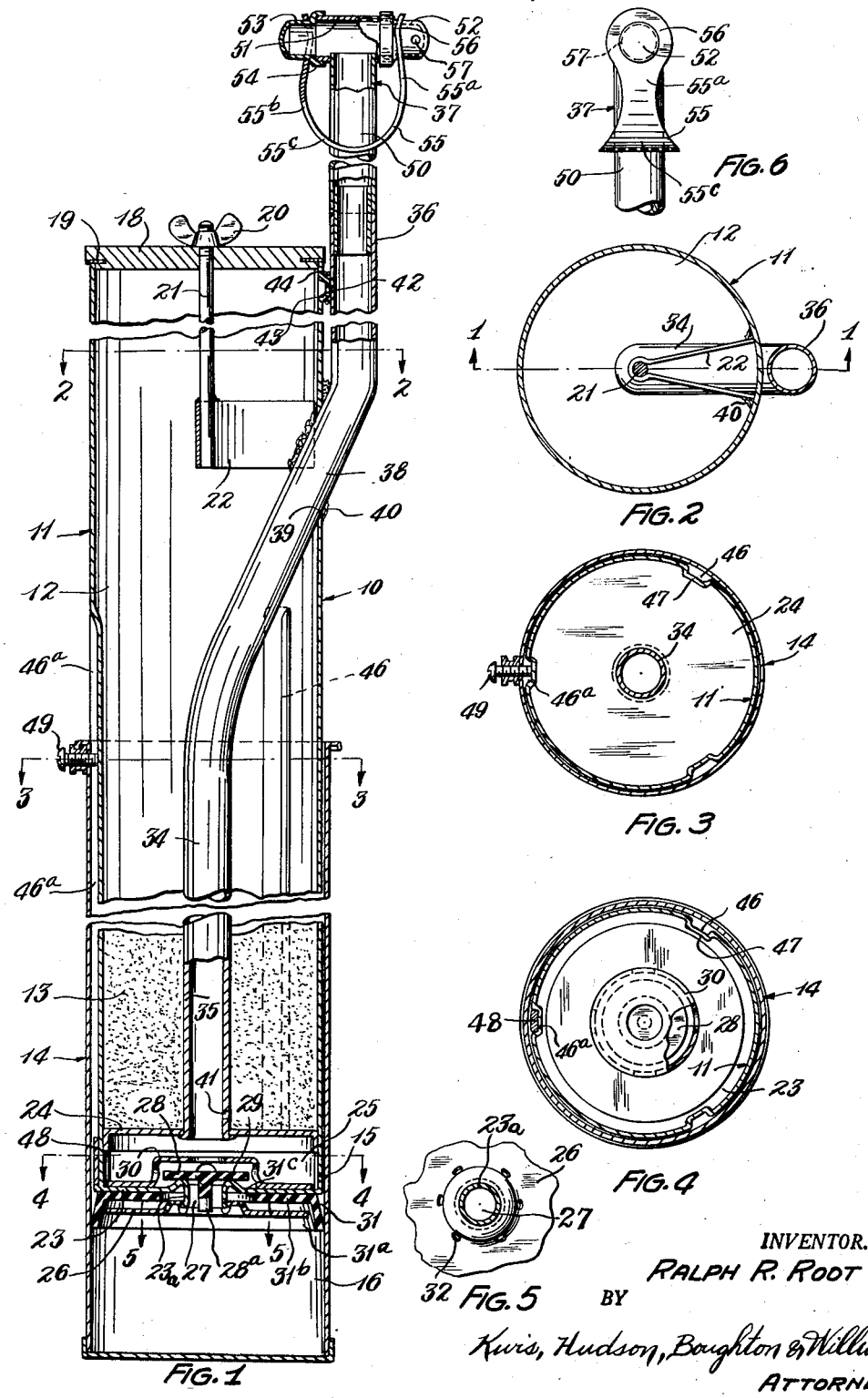
INVENTOR.
RALPH R. ROOT
BY
Kwis, Hudson, Boughton & Williams
ATTORNEYS Patented July 11, 1950

2,514,516

UNITED STATES PATENT OFFICE 2,514,516

DUSTER

Ralph R. Root, Lakewood, Ohio

Application March 26, 1946, Serial No. 657,099

4 Claims. (Cl. 43—147)

1

This invention relates to dusters for distributing insecticide and/or fungicide materials and, as one of its objects, aims to provide an improved device of this kind which can be economically manufactured and assembled, can be easily operated, and which will produce a good diffusion or atomization of the material to be distributed.

Another object of the present invention is to provide an improved duster of this character, in which a pair of cylinder and reservoir members in reciprocable telescoping relation form an air pump and a delivery conduit extending longitudinally of the reservoir is supplied with air by the pump and has feed connections with the reservoir adjacent opposite ends of the latter so that the device will be operable while being manually held in either an upwardly or downwardly extending direction.

A further object of the invention is to provide an improved manually portable duster of the character mentioned in which the wall of the reservoir member is grooved to afford one or more air inlet passages to the pump chamber and in which the connection of the delivery conduit with the pump chamber is controlled by a check valve.

The invention can be further briefly summarized as consisting in certain novel combinations and arrangements of parts hereinafter described and particularly set out in the appended claims.

In the accompanying sheet of drawings,

Fig. 1 is a longitudinal sectional view taken through a duster embodying the present invention, the view being taken substantially as indicated by section line 1—1 of Fig. 2, Fig. 2 is a transverse sectional view taken through the reservoir member at a point indicated by line 2—2 of Fig. 1, Fig. 3 is a transverse sectional view taken through the reservoir and cylinder members as indicated by line 3—3 of Fig. 1, Fig. 4 is a transverse sectional view taken at another point of the device and extending through the cylinder and reservoir members as indicated by line 4—4 of Fig. 1, Fig. 5 is a partial transverse sectional view taken through the plunger packing means as indicated by line 5—5 of Fig. 1, and Fig. 6 is a detached side elevational view of the delivery nozzle.

The improved duster 10 is of the manually portable type and is adapted to be manually operated while being carried. The device comprises, in general, a tubular reservoir member 11 having therein a chamber or reservoir 12 adapted to contain a supply of dust 13 and a tubular outer cylinder member 14 into which the inner end of the reservoir member extends so as to form a pump plunger 15 therein. A space 16 defined between the plunger 15 and the adjacent end of the cylinder member 14 constitutes the working chamber of the air pump formed by these members.

The reservoir member 10 may be made of sheet metal and comprises an elongated hollow member which is here shown as being substantially circular in cross section. This reservoir member has a filling opening at its outer end which is adapted to be closed by a removable cover 18. The cover is provided with a sealing gasket 19 so as to form a substantially air tight closure for the outer end of the reservoir and can be retained in its closed position by a wing nut 20 applied to the threaded outer end of the rod 21. The rod 21 extends axially of the reservoir member 11 and may be suitably mounted thereon as by means of a bracket 22.

The inner end of the reservoir member 11 is provided with a transverse end wall 23 and with an inner wall 24 which is spaced from the end wall so as to form therebetween a valve chamber 25. The end wall 23 has an axially extending central tubular portion 23a on which a retaining disk 26 is mounted in spaced relation to such end wall. The opening of the tubular portion 23a forms an air passage 27 which connects the valve chamber 25 with the pump chamber 16.

The air passage 27 is controlled by a check valve 28 which is located in the valve chamber 25 and opens in a direction to permit a flow of air from the pump chamber into the valve chamber. The check valve 28 cooperates with an annular seat 29 formed on the end wall 23 and is retained in cooperating relation with this seat by means of a cage or retainer 30. The check valve is here shown as having an axial stem portion 28a extending into the passage 27 and which assists in retaining the valve in proper cooperating relation to the seat 29.

The pump plunger 15 which is formed by the inner end of the reservoir member 11 is provided with packing means which, in this instance, is in the form of a flexible cup-type packing 31. The packing 31 has a flared sealing skirt 31a in engagement with the wall of the cylinder member 14 and is retained on the plunger 15 by having its transverse wall portion 31b disposed between the end wall 23 and the retaining disk 26. During a pumping stroke the plunger 15 and the end wall of the cylinder member 14 approach each other, causing air to be forced from the pump chamber 16 into the valve chamber 25, past the check valve 28. On the return stroke, the packing 31 is free to shift into engagement with the retaining disk 26, at which time air entering the pump chamber 16 can pass around the inner edge 31c of the packing 31 by flowing through the openings 32 of the retaining disk.

For delivering a dust and air mixture from the device, the reservoir member 11 is provided with a delivery conduit 34. This conduit may be in the form of a tube having its inner end 35 connected with the pump chamber 16 through the valve chamber 25 and having its outer end 36 extending outwardly of, or beyond, the reservoir member. The projecting end 36 can be left open for the discharge of a stream of dust and air directly therefrom or, as here shown, can be provided with a delivery nozzle 37 which will be presently described.

The portion of the conduit 34 extending outwardly from the plunger 15 is located inside of the reservoir member 11 and extends axially thereof. The outer or delivery end 36 of the conduit is preferably located adjacent to, but outside of, the reservoir member and this is made possible by constructing the conduit with an offset intermediate portion 38 which extends through an opening of the side wall of the reservoir member as indicated at 39. The opening of the reservoir wall through which the conduit portion 38 extends is sealed by solder 40, or the like, so as to maintain the reservoir substantially air-tight.

Dust from the reservoir 12 is admitted or fed to the passage of the conduit 34 through the inlet openings 41 and 42 which are located, respectively, adjacent the inner and outer ends of the reservoir. When the delivery end 36 of the conduit is located outside of the reservoir, as shown in Fig. 1, the opening 42 also extends through the wall of the reservoir member 11. For this purpose the wall of the reservoir member may be provided at this point with a small integral projection 43 against which the conduit is held by means of the solder 44.

When the duster is operated in an upwardly extending position, as shown in Fig. 1, such as would be desirable for treating overhead foliage, the dust supply 13 will shift by gravity to the inner end of the reservoir 12 and feeding of the dust into the conduit 34 will then take place through the opening 41. When the duster is operated in a downwardly extending position, such as would be desirable for treating ground crops, the dust supply in the reservoir will shift by gravity to the outer end of the reservoir and the feeding of dust into the conduit 34 will then take place through the opening 42.

In using this improved duster, the operator ordinarily grasps the outer portion of the reservoir member 11 with one hand and grasps the outer or lower end of the cylinder member 14 with the other hand. By reciprocating the cylinder member relative to the reservoir member, the desired pumping action is obtained and on each working stroke of the pump, a blast of air will be discharged past the check valve 28 and outwardly through the conduit 34. During the initial part of the working stroke of the pump, air will enter the reservoir 12 through the openings 41 and 43 and will create, to some extent, a pressure condition in the reservoir. During the remainder of the pump stroke this pressure in the reservoir tends to relieve itself by a flow of the air back out through the openings 41 and 42 with the result that some of the dust from the reservoir is fed or carried into the conduit through one or the other of the openings 41 or 42, depending upon the position in which the device is being held. The shifting of the dust in the reservoir 12 by the action of gravity thereon and by the alternate pressure and suction conditions produced in the reservoir by the action of the air pump, result in the dust supply 13 being always maintained in a very loose and readily flowing condition so that a continuous feeding of dust at the desired rate will take place into the conduit 34 during the working strokes of the air pump. On the return stroke of the cylinder member 14, the check valve 28 closes automatically to prevent dust from being sucked from the reservoir 12 into the pump chamber 16.

It will be understood, of course, that the size of the openings 41 and 42 can be selected or varied to suit the characteristics of the dust being used and the amount of dust required to be applied to the particular foliage being treated.

To facilitate the flow of air into the pump chamber 16 from atmosphere during the idle stroke of the pump, the wall of the reservoir member 11 is provided with one or more grooves 46 forming air passages leading to the pump chamber. In this instance the air passages 46 extend longitudinally of the reservoir member and are obtained by forming integral longitudinal ribs 47 in the wall of this member. These ribs also serve to reinforce the wall of the reservoir member. The air passages 46 are of a length such that their outer ends will always be located outwardly of the outer end of the cylinder member 14 so as to remain connected with the atmosphere during the entire return stroke of the pump.

To prevent complete separation of the cylinder and reservoir members during the relative reciprocation thereof, suitable stop means is provided for limiting the separating movement of these members. This stop means comprises an abutment member or block 48 mounted in the air inlet groove 46a at a point adjacent its inner end and a stop screw 49 carried by the outer end of the cylinder member and extending into the groove 46a for engagement with the abutment member 48. When complete separation of the cylinder and reservoir members is desired, the screw 49 is retracted from the air groove 46a, whereupon the plunger 15 can be withdrawn from the cylinder member.

The delivery nozzle 37 is of a novel construction and is here shown as having a hollow body or stem 50 which is connected to the outer end of the delivery conduit 34 and carries a transverse hollow head 51. The openings of the head 51 and passage of the stem 50 form a continuation of the passage of the delivery conduit 34. The open ends of the head 51 project laterally beyond the stem 50 and have nozzle cups 52 and 53 mounted thereon. These cups may be in the form of sheet metal stampings and each cup has a shouldered sleeve portion 54 adapted for telescoping engagement with the projecting ends of the head 51. These sleeve portions 54 are slidable and rotatable on the ends of the head 51 so as to permit the nozzle cups to be quickly and easily assembled onto the head and to be subsequently adjusted thereon in accordance with the direction in which the dust streams are to be projected.

The nozzle cups 52 and 53 are retained on the head 51 by means of a spring member 55 which is mounted on the stem 50 and has resilient arms 55a and 55b which engage the respective cups and maintain the latter in seated telescoping engagement on the ends of the head. The spring member 55 may be of a bowed shape and can be mounted on the stem 50 by having an opening in its intermediate portion 55c through which the stem extends. The resilient arms 55a and 55b have ring portions 56 at their ends which embrace the nozzle cups 52 and 53 and bear against the shoulders of the sleeve portions 54 for holding the cups on the ends of the head 51.

Each of the nozzle cups is provided with an orifice 57 of a desired size and which extends through the side wall of the cup. The above mentioned rotatable mounting of the nozzle cups on the head 51 permits these cups to be rotated so as to shift the nozzle openings 57 to a location for directing the dust streams in the desired direction or directions. The nozzle cups 52 and 53 can be adjusted on the head 51 with their orifices 57 aimed in the same direction, or with the orifices aimed in opposite or diverging directions. In the event of clogging of the orifices 57, or if it should be desirable to substitute nozzle cups having orifices of a different size, the cups 52 and 53 can be quickly detached from the head 51 by simply springing the resilient arms 55a and 55b outwardly relative to the stem 50 a distance sufficient to permit the shouldered portions 54 of the cups to be disengaged from the head and to permit the cups to be slid out of the ring portions 56 of the resilient arms.

From the foregoing description and the accompanying drawings it will now be readily understood that the present invention provides an improved duster which can be economically manufactured and assembled and which can be easily operated as a manually portable device. It will also be seen that this duster involves only a relatively few number of parts and is very compact by reason of the fact that the reservoir member also constitutes the plunger of the air pump.

Although the improved duster has been illustrated and described herein in more or less detail, it will be understood of course that the invention is not to be regarded as being correspondingly limited in scope but includes all changes and modifications coming within the spirit of the invention and the scope of the claims.

Having thus described my invention, I claim:

1. A duster comprising, an elongated cylinder member, a tubular reservoir member adapted to contain a supply of dust and having one end extending into said cylinder member and forming a plunger therein, said cylinder and reservoir members being relatively reciprocable and having a pump chamber therebetween, means for discharging dust from said reservoir member including a delivery conduit extending longitudinally of said reservoir member and having its inner end connected with said pump chamber and its outer end extending outwardly of said reservoir member, a check valve controlling the connection of said conduit with said pump chamber, said reservoir member having circumferentially spaced external longitudinal grooves therein of a length to form air inlet passages for said pump chamber, and a pair of cooperating stop elements carried by said cylinder and reservoir members for preventing complete separation thereof, the stop element of said reservoir member being located in one of said grooves and the stop element of said cylinder member extending into said one groove.

2. A duster comprising, an elongated cylinder member, a tubular reservoir member adapted to contain a supply of dust and having one end extending into said cylinder member and forming a plunger therein, said reservoir member having a filling opening at its outer end, a closure for said filling opening, said cylinder and reservoir members being relatively reciprocable and having a pump chamber therebetween, and means for discharging dust from said reservoir member including a delivery conduit extending longitudinally of said reservoir member, said conduit having its inner end portion located inside said reservoir member and connected with said pump chamber and its outer end portion located outside of the reservoir member and also having an intermediate portion extending through the side wall of said reservoir member.

3. A duster comprising, an elongated cylinder member, a tubular reservoir member adapted to contain a supply of dust and having one end extending into said cylinder member and forming a plunger therein, said cylinder and reservoir members being relatively reciprocable and having a pump chamber therebetween, said reservoir member having outer and inner end walls at said one end and spaced apart to define a valve chamber therebetween, said outer end wall having a tubular extension thereon containing a passage which provides communication between said valve chamber and said pump chamber and said outer end wall also having a valve seat surrounding an end of said passage, a packing cup carried by said reservoir member and having a wall portion adapted to seat against said outer end wall in surrounding relation to said tubular extension and also having a skirt portion adapted to cooperate with said cylinder member for sealing said pump chamber, a packing cup retainer spaced from said outer end wall and carried by said tubular extension, a delivery conduit extending longitudinally of said reservoir member and having its inner end communicating with said pump chamber through said valve chamber and passage and its outer end extending outwardly of said reservoir member, said conduit having openings communicating with the reservoir at points adjacent the opposite ends of the latter, and a check valve member in said valve chamber and cooperating with said valve seat for controlling the passage of air from said pump chamber into said conduit.

4. A duster comprising, an elongated cylinder member, a tubular reservoir member adapted to contain a supply of dust and having one end extending into said cylinder member and forming a plunger therein, said cylinder and reservoir members being relatively reciprocable and having a pump chamber therebetween, said reservoir member having outer and inner end walls at said one end and spaced apart to define a valve chamber therebetween, said outer end wall having a tubular extension thereon containing a passage which provides communication between said valve chamber and said pump chamber and said outer end wall also having a valve seat surrounding an end of said passage, a retaining disk spaced from said outer end wall and carried by said tubular extension, said retaining disk having air inlet openings therein adjacent its connection with said tubular extension, a packing cup carried by said reservoir member and comprising a skirt portion adapted for sealing cooperation with said cylinder member during a pumping stroke and a substantially flat transverse wall portion disposed between said outer end wall and said retaining disk, said packing cup being shiftable during the operation of said duster such that said transverse wall portion is engageable with said outer end wall during a pumping stroke and is engageable with said retaining disk during a suction stroke, said transverse wall portion having an opening therein of a size to uncover said air inlet openings while said transverse wall portion is in engagement with said retaining disk, a delivery conduit extending longitudinally of said reservoir member and having its inner end communicating with said pump chamber through said valve chamber and passage and its outer end extending outwardly of said reservoir member, said conduit having openings communicating with the reservoir at points adjacent the opposite ends of the latter, and a check valve member in said valve chamber and cooperating with said valve seat for controlling the passage of air from said pump chamber into said conduit.

RALPH R. ROOT.

REFERENCES CITED

The following references are of record in the file of this patent:

UNITED STATES PATENTS

| Number | Name | Date |
| --- | --- | --- |
| 180,135 | Jewett | July 25, 1876 |
| 809,281 | Buccieri | Jan. 9, 1906 |
| 1,272,283 | Madden | July 9, 1918 |
| 1,422,253 | Brown | July 11, 1922 |
| 1,676,462 | Root | July 10, 1928 |
| 1,777,278 | Huntington | Sept. 30, 1930 |
| 1,889,201 | Holveck | Nov. 29, 1932 |
| 2,086,696 | Brandt | July 13, 1937 |
| 2,116,715 | Rose | May 10, 1938 |
| 2,148,535 | Cone | Feb. 28, 1939 |
| 2,215,937 | Rutkowski | Sept. 24, 1940 |
| 2,226,013 | Oys | Dec. 24, 1940 |
| 2,431,081 | Rutkowski | Nov. 18, 1947 |